United States Patent [19]

Schauffele

[11] Patent Number: 4,739,419

[45] Date of Patent: Apr. 19, 1988

[54] APPARATUS FOR ELIMINATING MIDFIELD SKEW ERROR BY DELAYING THE LOWER HALF FIELD OF A T M FORMAT VIDEO SIGNAL TO BE RECORDED ON THE SECOND OF TWO TRACKS

[75] Inventor: Carl N. Schauffele, Rochester, N.Y.

[73] Assignee: Eastman Kodak Company, Rochester, N.Y.

[21] Appl. No.: 816,600

[22] Filed: Jan. 6, 1986

[51] Int. Cl.⁴ .................. H04N 5/782; H04N 9/81
[52] U.S. Cl. .................................. 360/9.1; 360/23; 358/310; 358/330
[58] Field of Search ............... 360/9.1, 33.1, 36.1, 360/36.2, 23; 358/310, 320, 330, 335, 337, 342

[56] References Cited

U.S. PATENT DOCUMENTS

| | | | |
|---|---|---|---|
| 4,068,259 | 1/1978 | Tinet et al. | 358/310 X |
| 4,115,759 | 9/1978 | Besenfelder | 360/26 X |
| 4,120,007 | 10/1978 | Sato | 360/64 |
| 4,163,247 | 7/1979 | Bock et al. | 358/310 X |
| 4,330,791 | 5/1982 | Ohara et al. | |
| 4,335,394 | 6/1982 | Warren | |
| 4,353,090 | 10/1982 | Broadbent | 358/342 |
| 4,361,856 | 11/1982 | Okamoto | 360/64 |
| 4,388,656 | 6/1983 | Lemke | 360/33.1 |
| 4,467,368 | 8/1984 | Horstmann | 358/310 |
| 4,488,182 | 12/1984 | Takahashi et al. | 358/310 |
| 4,491,861 | 1/1985 | Sochor | 358/310 X |
| 4,517,609 | 5/1985 | Yoshihiko | 360/23 X |
| 4,532,557 | 7/1985 | Larkins | 360/33.1 |
| 4,549,227 | 10/1985 | Hashimoto et al. | 358/310 X |
| 4,564,867 | 1/1986 | Nakajima | 358/342 |
| 4,597,019 | 6/1986 | Nishimoto et al. | 358/310 X |
| 4,609,947 | 9/1986 | Yamagiwa et al. | 360/9.1 X |
| 4,618,894 | 10/1986 | Ichinoi | 358/310 |
| 4,623,940 | 11/1986 | Matsumoto et al. | 360/36.2 X |
| 4,641,201 | 2/1987 | Ichinoi et al. | 360/9.1 X |

Primary Examiner—Raymond F. Cardillo
Assistant Examiner—Wayne R. Young
Attorney, Agent, or Firm—William F. Noval

[57] ABSTRACT

A video tape reproduction apparatus is operable in a conventional mode in which a field of video information is recorded in a single track on magnetic tape, and in a high quality mode in which a field of video information is recorded in two adjacent tracks. In the high quality mode, in order to minimize skew errors (which may occur during playback when switching in mid-field from track to track), the second half of the field is delayed before it is recorded in the second track. Preferably the first half of each field is recorded with an integral number of horizontal lines so that switching is effected during a horizontal blanking interval.

4 Claims, 3 Drawing Sheets

APPARATUS FOR ELIMINATING MIDFIELD SKEW ERROR BY DELAYING THE LOWER HALF FIELD OF A T M FORMAT VIDEO SIGNAL TO BE RECORDED ON THE SECOND OF TWO TRACKS

BACKGROUND OF THE INVENTION

This invention relates in general to video tape reproduction apparatus such as helical scan video cassette recorders. More particularly, this invention relates to a video tape reproduction apparatus which is operable in a high quality mode in which a field of video information is recorded on two adjacent helically scanned tracks on tape. The second half of the field is delayed, when it is recorded on the second track, in order to eliminate skew-induced gaps in the signal as playback is switched from the first to the second track.

The standard broadcast color video signal has a greater bandwidth than is generally utilized in conventional television receivers and video cassette recorders. Thus, the composite NTSC color television signal has a luminance signal with a bandwidth of approximately 4.2 MHz and chrominance signals with bandwidths as great as 1.3 MHz. When the NTSC video signal is utilized in a VCR, the bandwidth of the luminance and chrominance signals are reduced in order to achieve acceptably long playing time and low video noise in conjunction with a reasonable tape cassette size. This reduction in bandwidth, however, results in a reduction in image resolution and quality.

It has been proposed in commonly-assigned, copending U.S. patent application Ser. No. 725,873 entitled VIDEO REPRODUCTION APPARATUS, filed Apr. 22, 1985, by Carl Schauffele, to provide a video reproduction apparatus which may be operated in either a conventional mode or a high quality mode. In the conventional mode, a color under format color video signal of reduced bandwidth is helically recorded on magnetic tape such that each field of the video signal is recorded on a single track on the magnetic tape. In the high quality mode, in a preferred embodiment of the invention, a time division multiplex (TDM) format color video signal of increased bandwidth is recorded on tape which is moved twice as fast as the speed of the tape in the conventional format recording, and with a magnetic transducer which is rotated at twice the rotational speed as in the conventional format mode. Thus, a field of video information in the TDM format is recorded on two adjacent tracks, the upper half of a video field being recorded on one track and the lower half of the field being recorded on the other track.

The video reproduction apparatus disclosed in the latter patent application is highly advantageous in giving a VCR operator the choice of recording either in a high quality mode, or in a conventional mode. Difficulties may arise, however, during playback of the TDM format video signal due to skew errors caused when switching between signals successively reproduced from the two tracks of a field. Skew errors result from differences in tension of the magnetic tape between the time of recording a video signal on the tape and the time the video signal is played back causing bunching up or stretching out of horizontal lines of signals. At the head switching point, a skew error of several microseconds can affect horizontal synchronization in the reproduced scene causing discontinuities and distortions in the televised image. The most serious of those discontinuities occurs if the skew error is such that the video signal on the second track of a field, ready by the second head, slightly precedes that on the first track. In this case, when playback is switched from track one to track two, an interval of the picture signal is uncorrectably lost. Since the switching occurs in the middle of the viewing area, image degradation is particularly annoying. Skew error is especially critical in the disclosed time division multiplex format, which uses a compressed horizontal sync signal which is substantially shorter in duration than the normal horizontal sync signal of a composite NTSC color video signal. Thus a variation in tape tension will more likely result in a failure to pick up the compressed horizontal sync pulse when switching in mid-field.

SUMMARY OF THE INVENTION

According to the present invention, there is provided a solution to the problem of skew errors which may result when switching in the middle of a field of a high quality color video signal recorded on two tracks on magnetic tape. Improved performance is effected in video reproduction apparatus which is selectively operable in a conventional mode in which a field of a color video signal in a conventional format is recorded on a single track on magnetic tape and in a high quality mode in which a field of a color video signal in a TDM format is recorded in two adjacent tracks on magnetic tape. According to an aspect of the invention, the video signal representing the second half of each field in the TDM format is delayed several microseconds before recording on the second track. Upon playback, the entire video signal (including the compressed horizontal sync) will be recovered from the tape so that skew errors will be eliminated at mid-field switch. According to another aspect of the invention, in the high-quality mode, the first half of each field is recorded with an integral number of horizontal lines of video signal so that mid-field switch is effected out of the viewing area of the television screen during the horizontal blanking interval.

DESCRIPTION OF THE DRAWINGS

In the detailed description of the embodiment of the invention presented below, reference is made to the accompanying drawings in which like elements are numbered with like numbers.

DESCRIPTION OF THE PREFERRED EMBODIMENT

In the following description relating to a preferred embodiment of the present invention, it is assumed that a standard NTSC composite color video signal is processed by the video reproduction apparatus described. It will be appreciated, however, that other video signal systems such as PAL and SECAM systems may also be used in accordance with the present invention. In the NTSC format, 30 frames of color video information are transmitted each second with each frame including two interlaced fields. The composite video signal includes a luminance signal and two chrominance signals, which are modulated on a carrier signal and a color subcarrier signal, respectively. As described in the above-mentioned U.S. patent application Ser. No. 725,873, the NTSC format color video signal may be recorded in one of two modes by the video reproduction apparatus therein described. In the conventional mode, the bandwidths of the luminance and chrominance signals of the color video signal are reduced so that the resolution of a reproduced image is likewise reduced. In the high quality TDM mode of the described video reproduction apparatus, the bandwidths of the luminance and chrominance signals are recorded and played back substantially as broadcast resulting in a high resolution, high quality image reproduced on a video monitor.

Figure 1:
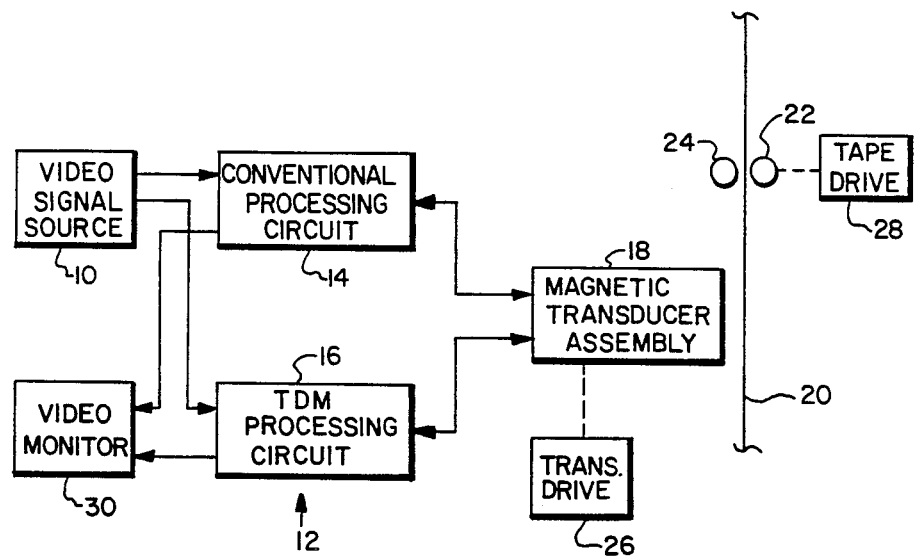
FIG. 1 is a block diagram of video reproduction apparatus incorporating an embodiment of the present invention.

Referring now to FIG. 1, there is shown in block diagram a video reproduction apparatus incorporating a preferred embodiment of the present invention. As shown, a video signal source 10 such as a cable, broadcast or satellite transmission source or an originating source such as a camera provides a composite NTSC color video signal to a video reproduction apparatus 12. Apparatus 12 is described in greater detail in the aforementioned U.S. patent application Ser. No. 725,873 and the disclosure thereof is hereby referred to for a more detailed description of the bimodal reproduction apparatus therein described. In general, apparatus 12 includes a conventional format processing circuit 14 and a high resolution TDM format processing circuit 16. The composite NTSC video signal from source 10 is selectively provided to either of these processing circuits by means of a control (not shown). Conventional processing circuit 14 reformats the composite video signal into a color under signal in which the luminance signal is reduced in bandwidth and modulated on an FM carrier signal. The chrominance signal is also reduced in bandwidth and converted to a lower frequency carrier signal which has a bandwidth which is outside of the bandwidth of the FM modulated luminance signal. The color under color video signal is then provided to a magnetic transducer assembly 18 which may, for example, include a pair of oppositely disposed magnetic heads mounted for rotation on a head drum. Helically wrapped about the head drum is a length of magnetic tape 20 which is moved by means of capstan 22 in contact with idler roller 24. In the recording and playback of a conventional format color video signal, magnetic transducer assembly 18 is rotated by means of head drive 26 at a first rotational speed, e.g., if a pair of magnetic heads are used for recording, the head drum carrying the magnetic heads is rotated at a speed of 1,800 revolutions per minute. Simultaneously, capstan 22 and roller 24 drive tape 20 at a first speed past the magnetic heads of assembly 18.

Figure 3:
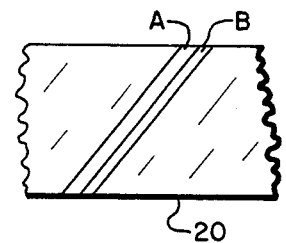
FIGS. 3 and 4 are diagrammatic views of magnetic tape respectively illustrating conventional format recording and TDM format recording.
Figure 4:
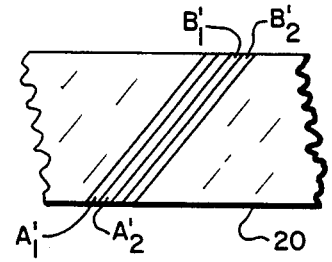

As disclosed in the aforementioned U.S. patent application Ser. No. 725,873, when apparatus 12 is operated in a high quality mode, an NTSC format signal supplied to TDM processing circuit 16 is reformated in a time division multiplex (TDM) format. In the TDM format, the luminance, chrominance and horizontal sync signals are compressed in time and rearranged in a time sequential manner over each horizontal line interval. In this format, the bandwidths of the luminance and chrominance signals are not substantially reduced. Consequently, the magnetic transducer assembly 18 is rotated at twice the speed of rotation as in the conventional format, and magnetic tape 20 is moved by capstan 22 at twice the speed as in the conventional format. Thus, whereas in the conventional mode the two fields of a frame of color video signals are recorded in two sequential tracks A and B (see FIG. 3) on a section of magnetic tape 20; in the TDM high resolution mode, the two fields of the TDM signal are recorded on four sequential tracks. Thus, the first field of a frame is recorded in a pair of tracks $A'_1$ and $A'_2$ and the second field of a frame is recorded in a pair of tracks $B'_1$ and $B'_2$ (FIG. 4).

Reference is made to the aforementioned U.S. patent application Ser. No. 725,873 for a more detailed description of the conventional format processing circuits and a magnetic transducer assembly which may be used in the video reproduction apparatus 12.

Figure 2:
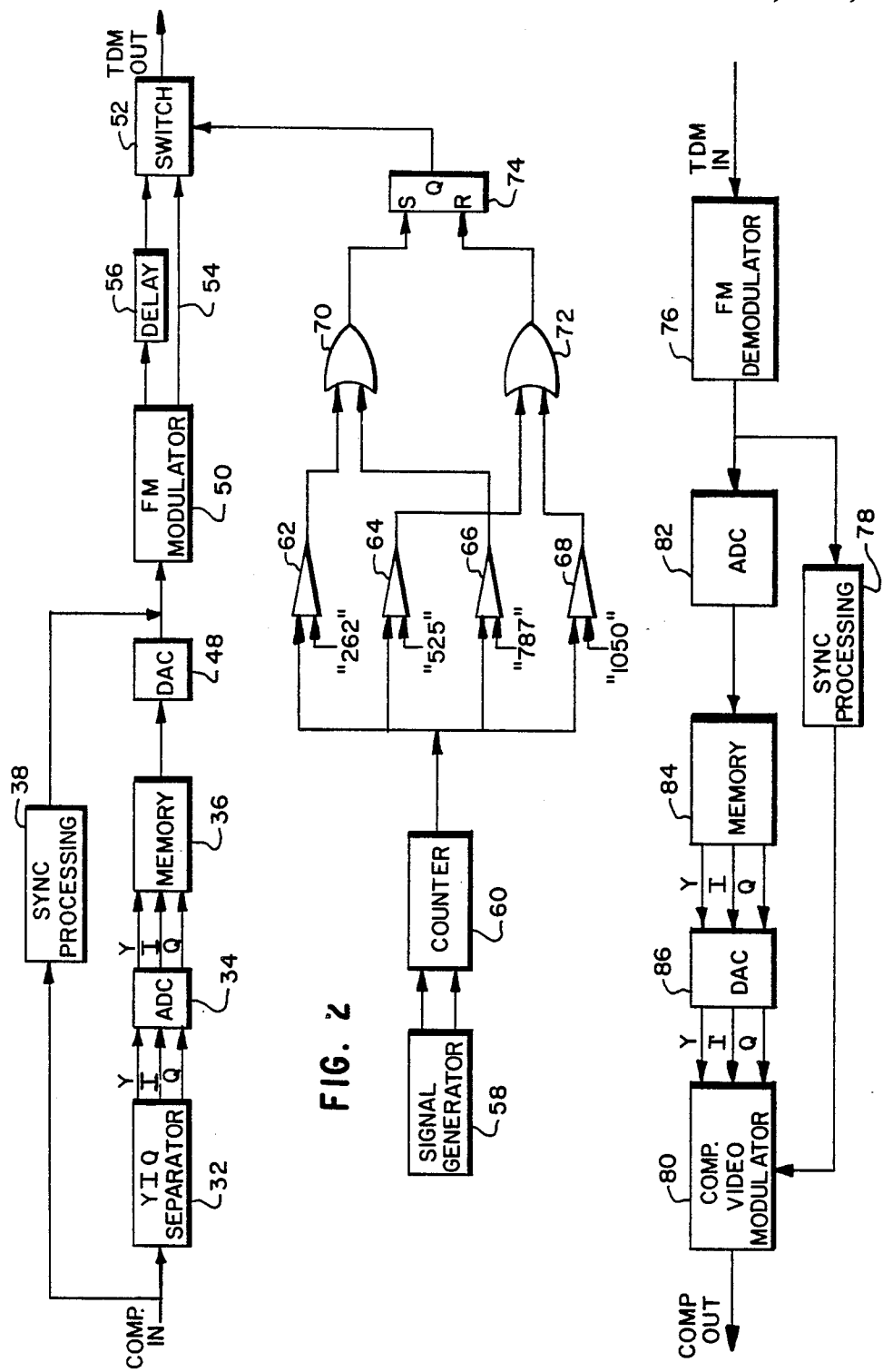
FIG. 2 is a block schematic diagram showing in greater detail the TDM processing circuit of FIG. 1.

Referring now to FIG. 2, there will be described in greater detail TDM processing circuit 16 which includes a preferred embodiment of the present invention. As shown in FIG. 2, a composite NTSC video signal is provided to YIQ separator circuit 32, which separates the luminance (Y) signal and the chrominance (I, Q) signals from the composite video signal. The I and Q signals are then demodulated into baseband I and Q signals. The bandwidths of these signals are not substantially reduced so that a high resolution signal is available for recording and playback. However, the time domain of each signal is compressed and the time compressed signals are rearranged in time sequential manner for recording. The YIQ signals are simultaneously supplied to analog to digital converter (ADC) 34 which samples each of the base band analog video component signals at sampling frequencies which satisfy the sampling theory. Assuming that the Y signal has a bandwidth of 4.2 MHz, the I signal has a bandwidth of 1.3 MHz and the Q signal has a bandwidth of 0.6 MHz, illustrative frequencies for sampling these signals are 14.097 MHz for sampling the Y signal, 4.027 MHz for sampling the I signal, and 2.013 MHz for sampling the Q signal. ADC 34 converts the sampled analog signals into digital signals which are stored in digital memory 36 at the respective sampling frequencies.

Figure 6A:
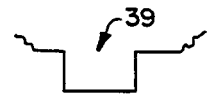
FIGS. 6A and 6B are timing diagrams respectively of the NTSC horizontal sync signal and the TDM compressed horizontal sync signal.
Figure 6B:
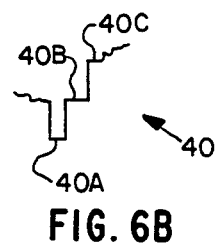

Sync processing circuit 38 converts the horizontal sync of the composite NTS color video signal into a shorter duration compressed sync TDM signal. This is shown more clearly in FIGS. 6A and 6B. FIG. 6A shows an NTSC horizontal sync signal 39 of approximately 5 microseconds duration within the horizontal blanking signal of approximately 11.2 sec. duration. Sync processing circuit 38 forms the compressed TDM sync signal 40 shown in FIG. 6B, which includes a compressed sync signal 40A of 1 microsecond duration, a black reference level signal 40B of 1 microsecond duration, and a gray reference level signal 40C of 1 microsecond duration. Thus, the total duration of the compressed TDM sync signal equals 3 microseconds as compared to the NTSC horizontal blanking signal of 11.2 microseconds.

Figure 5:
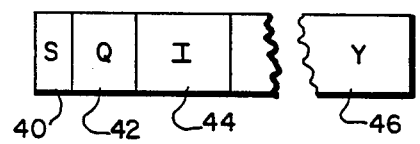
FIG. 5 is a representational time diagram of a horizontal line of TDM format video signals.

The TDM signal shown in FIG. 5 is formed by sequentially actuating the sync processing circuit 38 to produce the S compressed sync signal 40 and by sequentially reading out of memory 36 at a compression sampling frequency of 18.125 MHz, the I compressed signal 42, the Q compressed signal 44, and the Y compressed signal 46. The digital signals read out of memory 36 are converted to analog compressed signals by digital to analog converter (DAC) 48. FM modulator 50 modulates the TDM signal onto an FM carrier.

According to the present invention, a field of a color video signal in a high quality format, such as the TDM format, is recorded in two adjacent tracks with the upper half of the field recorded in the first track of a pair of tracks and the lower half of the field recorded in the second track of the pair of tracks. Thus, a switch between tracks is effected in the middle of the field. In such case, the initial part of the video signal recorded on the second track may be lost because of an overlap in time with the terminal part of the video signal recorded on the first track. According to the present invention, the lower half of a field of video signal is delayed for a few microseconds before recording on the second track in order to minimize the possibility of losing mid-field information upon playback.

Thus, as shown in FIG. 2, the FM modulated signal is applied to switch 52 either directly over channel 54 or by means of delay 56. Delay 56 has a value of several microseconds (e.g. 10 ms.) and delays the video signal by this duration before it is applied to switch 52. Switch 52 is controlled by a control circuit which includes a signal generator 58 and a counter 60. At the beginning of a frame of color video information to be recorded on tape 20, generator 58 produces a frame sync signal which resets counter 60. Generator 58 also supplies digital counter 60 with a series of pulses at twice the horizontal sync frequency (2H). The output of counter 60 is supplied to an input of each of a plurality of digital comparators 62, 64, 66 and 68. Digital comparator 62 also has a digital comparison input of "262"; digital comparator 64 has a digital comparison input of "525"; digital comparator 66 has a digital comparison input of "787"; and digital comparator 68 has a digital comparison input of "1050".

The outputs of comparators 62 and 66 are applied to an OR gate 70 the output of which is applied to the S input of flip flop 74. The outputs of comparator 64 and 68 are applied to an OR gate 72 the output of which is applied to the R input of flip flop 74. The output Q of flip flop 74 is applied to switch 52 to control a delayed or undelayed signal to be recorded on tape 20 by means of magnetic transducer assembly 18. A brief explanation of the problem to which the present invention is addressed will assist in a better understanding of the operation of the circuit of FIG. 2. When a conventional format color video signal is recorded on magnetic tape 20 by means of magnetic transducer assembly 18, an entire field of video information is recorded on each track. Thus, in a 525 horizontal line video frame, 262.5 horizontal lines of video signal will be recorded on each track. Since switching between tracks is effected substantially near the beginning of the vertical sync period, skewing and image artifacts caused thereby are minimized. In the TDM format described above and disclosed in copending U.S. patent application Ser. No. 725,873, if the 525 horizontal lines of a frame of video information are recorded equally in four tracks on tape 20, each track would contain 131.25 horizontal lines of video signal. Switching between the first and second tracks of a field would occur not only in the middle of the field, but also in the middle of a horizontal line. Thus, any skew errors resulting from mid-field switching during playback will effect loss of horizontal sync and disturbances in the reproduced scene on a television screen.

According to one aspect of the present invention, an integral number of horizontal lines are recorded in the first track of each field of a frame so that mid-field switching occurs at the end of a horizontal line during the horizontal sync period. Thus the control scheme shown in FIG. 2 effects the recording of 131 horizontal lines in the tracks A'₁ and B'₁ (FIG. 4) and 131.5 horizontal lines in the tracks A'₂ and B'₂. According to a further feature of the present invention, the second half of the field is delayed prior to recording in order to eliminate the possibility of signal overlap between adjacent tracks and consequent loss of horizontal sync.

Figure 7A:
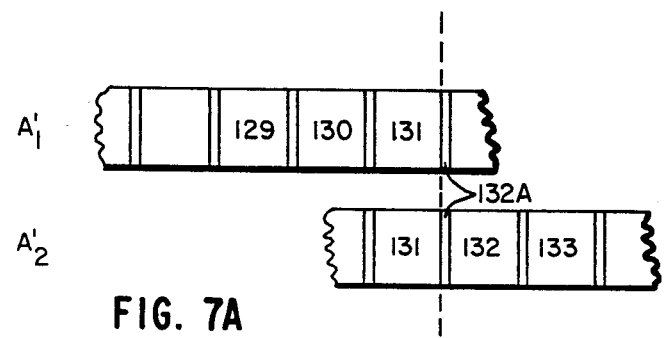
FIGS. 7A, 7B, and 7C are diagrammatic views of reproduced signals illustrating the skew correction technique of the present invention.
Figure 7B:
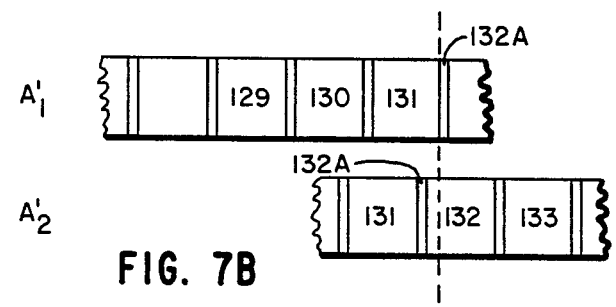
Figure 7C:
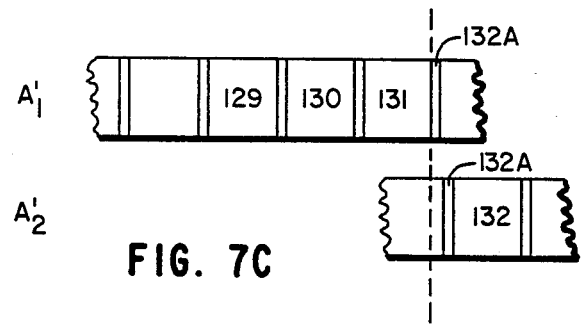

This is illustrated more clearly with reference to FIGS. 7A–7C. As shown in FIG. 7A, an ideal switch is effected between the signals reproduced from tracks A'₁ and A'₂, so that there is a smooth transition from the horizontal line 131 at the end of the track A'₁ signal to horizontal line 132 at the beginning of the track A'₂ signal. However, if as shown in FIG. 7B there is an overlap of the tracks A'₁ and A'₂ signals at the time of playback caused by tape tension differences, the horizontal sync portion 132A of horizontal line 132 will be not be reproduced during playback. According to the present invention as shown in FIG. 7C, since the track A'₂ signal was delayed before it was recorded on track A'₂, upon playback it is also delayed for several microseconds. If the playback of the track A'₂ signal does occur earlier than it should due to distortion in the magnetic tape (dotted line portion), the horizontal sync portion of the next horizontal line will be played back, thus obviating loss of the horizontal sync and consequent degradation of the reproduced video information.

Referring again to FIG. 2, at the beginning of the recording of a frame of video information in the TDM format, counter 60 is set to zero by the frame sync pulse from generator 58. Switch 52 is set to pass the video signal on channel 54 to magnetic transducer assembly 18 to effect the direct recording of the first 131 horizontal lines of the TDM signal on track A'₁ of tape 20 (FIG. 4). At a count of 262 pulses of the 2H signal, (as detected by digital comparator 62) which corresponds to the end of horizontal line 131, a coincidence will occur and comparator 62 will produced a signal which will be passed by OR gate 70 to the S input of flip flop 74. The output of flip flop 74 will actuate switch 52 to pass the video information which has been delayed by delay 56, so that the video information recorded on track A'₂ will be delayed by the delay time of delay 56 (for example, 5 to 10 microseconds). When counter 60 has counted 525 pulses of the 2H signal provided by generator 58, digital comparator 64 will produce an output which is passed by OR gate 72 to R input of flip flop 74. The output of flip flop 74 actuates switch 52 to switch the signal to be recorded by assembly 18 to the video information appearing on channel 54, which information represents the upper half of the second field of the frame of video information.

When counter 60 has counted 787 pulses, (which corresponds to the first 131 horizontal lines of the second field) digital comparator 66 will produce an output signal which is passed by OR gate 70 to S input of flip flop 74. Switch 52 is actuated to pass the video information which has been delayed by delay 56 to be recorded on track B'₂. Finally, when counter 60 counts 1050 pulses, digital comparator 68 will produce an output which is passed by OR gate 72 to the R input of flip flop 74 to actuate switch 52 in preparation for recording the next frame of video information. This operation will be repeated for successive frames. Thus, the 525 horizontal lines of a frame of TDM video signal will be recorded on tape 20 as follows: 131 lines in track A'₁; 131½ lines in trach A'₂; 131 lines in track B'₁; and 131½ lines in track B'₂.

After the video information has been recorded on tape 20, the video signal reproduced from tape 20 by magnetic transducer assembly 18 will be applied to FM demodulator 76 which demodulates the compressed sync signal and compressed TDM video component signals of each horizontal line. The compressed horizontal sync signal is applied to sync processing circuit 78 which reconstructs the composite horizontal sync and blanking signal and applies it to composite video modulator 80 after a suitable delay to allow processing of the compressed TDM video component signals. The compressed Q signal, the compressed I signal and the compressed Y signal of the TDM signal are sequentially applied to analog to digital converter (ADC) 82 and written into digital memory 84 at the compression sampling frequency of 18.125 MHz. In order to reconstruct the composite video signal, the Y I and Q signals are simultaneously read out of memory 84 at their respective expansion sampling frequencies of 14.097 MHz, 4.027 MHz, and 2.013 MHz. The digital signals are converted by digital to analog converter (DAC) 86 into simultaneous analog signals which are processed in composite video modulator 80 along with the horizontal sync and blanking signal to produce a composite NTSC color video signal which is then applied to video monitor 30.

It will be appreciated that instead of digital memories 36 and 84, analog memories (such as CCD memories) may be used in lieu thereof. In which case, ADC's 34 and 82 and DAC's 48 and 86 of TDM processing circuit 16 would be unnecessary, and the sampled analog signals can be written directly into and read directly out of memories 36 and 84. It will also be appreciated, that memories 36, 84 may comprise a single memory which is used for both recording and playback of TDM signals.

The invention has been described in detail with particular reference to preferred embodiments thereof, but it will be understood that variations and modifications can be effected within the spirit and scope of the invention.

What is claimed is:

1. Video tape reproduction apparatus comprising:
   magnetic tape moving means for moving magnetic tape along a path;
   magnetic transducer means located along said tape path for recording video signals in slant parallel tracks on said magnetic tape;
   circuit means for selectively providing to said transducer means a video signal of a conventional format or a video signal of a high-quality format;
   means for rotating said transducer means (a) at a first rotational speed for recording a field of said conventional format video signal in a single track on said magnetic tape and (b) at a second rotational speed which is twice said first rotational speed, for recording a field of said high quality format video signal in a pair of adjacent tracks on said magnetic tape such that approximately the upper half of said field is recorded on the first track of said pair of tracks on said tape and the lower half of said field is recorded on the second track of said pair of tracks on said tape; and
   video signal delay means operative only when said high-quality format video signal is recorded on said magnetic tape to delay the recording of the lower half of said field of high-quality format video signals on the second track of said pair of adjacent tracks on said magnetic tape.

2. The apparatus of claim 1 including control means for causing an integral number of lines of high-quality format video signal to be recorded on the first track of each pair of tracks recording a field of video signal on said magnetic tape.

3. Video tape reproduction apparatus comprising:
   magnetic tape moving means for moving magnetic tape along a path;
   magnetic transducer means located along said tape path for recording video signals in slant parallel tracks on said magnetic tape;
   circuit means for selectively providing to said transducer means a video signal of a conventional format or a video signal of a high-quality, time-division-multiplex format;
   means for rotating said transducer means (a) at a first rotational speed for recording a field of said conventional format video signal in a single track on said magnetic tape and (b) at a second rotational speed which is twice said first rotational speed, for recording a field of said time-division-multiplex format video signal in a pair of adjacent tracks on said magnetic tape such that approximately the upper half of said field is recorded on the first track of said pair of tracks on said tape and the lower half of said field is recorded on the second track of said pair of tracks on said tape; and
   video signal delay means operative only when said time-division-multiplex format video signal is recorded on said magnetic tape to delay the recording of the lower half of said field of time-division-multiplex format video signals on the second track of said pair of adjacent tracks on said magnetic tape.

4. The apparatus of claim 3 including control means for causing an integral number of lines of time-division-multiplex format video signal to be recorded on the first track of each pair of tracks recording a field of video signal on said magnetic tape.

* * * * *